US012801843B2

(12) United States Patent
Wang

(10) Patent No.: US 12,801,843 B2
(45) Date of Patent: Nov. 17, 2026

(54) METHOD OF RECOGNIZING TEXT, TRAINING METHOD, AND ELECTRONIC DEVICE

(71) Applicant: Beijing Baidu Netcom Science Technology Co., Ltd., Beijing (CN)

(72) Inventor: Yaqing Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 171 days.

(21) Appl. No.: 18/651,183

(22) Filed: Apr. 30, 2024

(65) Prior Publication Data

US 2024/0281602 A1 Aug. 22, 2024

(30) Foreign Application Priority Data

Jun. 30, 2023 (CN) ........................ 202310802724.7

(51) Int. Cl.
*G06F 40/20* (2020.01)

(52) U.S. Cl.
CPC .................................. *G06F 40/20* (2020.01)

(58) Field of Classification Search
None
See application file for complete search history.

(56) References Cited

U.S. PATENT DOCUMENTS 11,423,072 B1 * 8/2022 Chen .................... G06F 18/253
11,977,569 B2 * 5/2024 Potter .................... G06F 16/35
2016/0098645 A1 * 4/2016 Sharma .................... G06N 7/01 706/12
2019/0236492 A1 * 8/2019 Saha .................... G06F 40/295
2024/0193368 A1 * 6/2024 Kirch .................... G06F 40/284

FOREIGN PATENT DOCUMENTS

CN 111160564 A 5/2020
CN 112084331 A 12/2020
CN 113220836 A 8/2021
(Continued)

OTHER PUBLICATIONS

Zhao et al. "TDRE: A Tensor Decomposition Based Approach for Relation Extraction". arXiv:2010.07533v1 [cs.AI] Oct. 15, 2020 (Year: 2020).*
(Continued)

*Primary Examiner* — Jesse S Pullias
(74) *Attorney, Agent, or Firm* — HSML P.C.

(57) ABSTRACT

A method of processing a text, a training method, a method of generating a knowledge graph, an electronic device, and a non-transitory computer-readable storage medium are provided, which relates to a field of artificial intelligence, particularly to fields such as deep learning, natural language processing, computer vision, and speech processing. The method of processing a text includes: encoding a text to be processed to obtain a feature information; identifying a plurality of entity information from the text, based on the feature information; generating a word relation tensor based on the feature information; and determining a relation between the plurality of entity information by using the word relation tensor, so as to generate a plurality of relational triplets related to the text.

10 Claims, 7 Drawing Sheets

(56) References Cited

FOREIGN PATENT DOCUMENTS

CN 115146068 A 10/2022

OTHER PUBLICATIONS

Ma et al. "End-to-end Sequence Labeling via Bi-directional LSTM-CNNs-CRF". Proceedings of the 54th Annual Meeting of the Association for Computational Linguistics, pp. 1064-1074, Berlin, Germany, Aug. 7-12, 2016 (Year: 2016).*

Wadden et al. "Entity, Relation, and Event Extraction with Contextualized Span Representations". Proceedings of the 2019 Conference on Empirical Methods in Natural Language Processing and the 9th International Joint Conference on Natural Language Processing, pp. 5784-5789, Nov. 3-7, 2019 (Year: 2019).*

Wang et al. "TPLinker: Single-stage Joint Extraction of Entities and Relations Through Token Pair Linking". Proceedings of the 28th International Conference on Computational Linguistics, pp. 1572-1582 Barcelona, Spain (Online), Dec. 8-13, 2020 (Year: 2020).*

Zheng et al. "PRGC: Potential Relation and Global Correspondence Based Joint Relational Triple Extraction". Proceedings of the 59th Annual Meeting of the Association for Computational Linguistics and the 11th International Joint Conference on Natural Language Processing, p. 6225-6235 Aug. 1-6, 2021 (Year: 2021).*

First Chinese Office Action, issued in the corresponding Chinese patent application No. 202310802724.7, dated Dec. 5, 2025, 20 pages with the machine translation.

* cited by examiner

100

500

METHOD OF RECOGNIZING TEXT, TRAINING METHOD, AND ELECTRONIC DEVICE

CROSS-REFERENCE TO RELATED APPLICATIONS

This application claims priority to Chinese Application No. 2023108027247 filed on Jun. 30, 2023, which is incorporated herein by reference in its entirety.

TECHNICAL FIELD

The present disclosure relates to a field of artificial intelligence, particularly to technical fields such as deep learning, natural language processing (NLP), computer vision, and speech processing.

BACKGROUND

A knowledge graph is a structured semantic knowledge base that may use a visual graph to describe concepts and their interrelationships in the physical world. The knowledge graph has a wide range of applications in search, question answering, and assisting big data analysis.

A relational triplet is a key component of the knowledge graph, so extracting the relational triplet from texts with different sources and structures is a crucial step in an automated construction of the knowledge graph.

SUMMARY

The present disclosure provides a method of processing a text, a method of training a deep learning model, a method of generating a knowledge graph, an electronic device, and a non-transitory computer-readable storage medium.

According to an aspect of the present disclosure, a method of processing a text is provided, including: encoding a text to be processed to obtain a feature information; identifying a plurality of entity information from the text, based on the feature information; generating a word relation tensor based on the feature information; and determining a relation between the plurality of entity information by using the word relation tensor, so as to generate a plurality of relational triplets related to the text.

According to another aspect of the present disclosure, a method of training a deep learning model is provided, including: inputting a word feature matrix corresponding to a sample feature information into the deep learning model, so as to obtain a sample word relation tensor; and adjusting a parameter of the deep learning model according to a difference between the sample word relation tensor and a real word relation tensor, to obtain a trained deep learning model.

According to another aspect of the present disclosure, a method of generating a knowledge graph is provided, including: generating the knowledge graph by using a plurality of relational triplets; wherein the plurality of relational triplets are generated by the method of processing a text provided by the present disclosure.

According to another aspect of the present disclosure, a method of generating a knowledge graph is provided, including: encoding a text to be processed to obtain a feature information; identifying a plurality of entity information from the text, based on the feature information; inputting a word feature matrix corresponding to the feature information into a deep learning model, so as to obtain a word relation tensor; generating a plurality of relational triplets according to the word relation tensor and the plurality of entity information; and generating the knowledge graph by using the plurality of relational triplets; wherein the deep learning model is trained by the method of training a deep learning model provided by the embodiments of the present disclosure.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement at least one of the following methods provided by the present disclosure: the method of processing a text, the method of training a deep learning model, and the method of generating a knowledge graph.

According to another aspect of the present disclosure, a non-transitory computer-readable storage medium having computer instructions stored thereon is provided, wherein the computer instructions are used to cause a computer to implement at least one of the following methods provided by the present disclosure: the method of processing a text, the method of training a deep learning model, and the method of generating a knowledge graph.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Constructing a knowledge graph includes data acquisition, knowledge extraction, knowledge fusion, and knowledge processing. The knowledge extraction is a process of extracting entities and relations between the entities from data with different sources and structures. For example, the knowledge extraction may involve extracting a relational triplet from data. The relational triplet includes two entities and a semantic relation between these two entities. For example, the relational triplet may include a subject entity (also referred as subject), a relation, and an object entity (also referred as object). The subject entity may be called a head entity, and the object entity may be called a tail entity. One head entity and one tail entity form an entity pair.

In the process of extracting the relational triplet, there may be a relation overlap and an entity overlap. For example, in the data, there may be only one entity pair and relation, there may be a plurality of relations between the entity pair, or there may be a plurality of relations between one entity and a plurality of different entities.

Due to the complexity of natural language, there are some difficulties in the process of extracting the relational triplet. For example, the number of entities and the relation between entities in the data are not fixed, which makes the extraction of relational triplets uncertain. For example, due to the complexity of semantics in real life, it is desired to consider the correlation between entities with different relation types. For example, a complex relation structure may encounter overlapping issues, such as two different relational triplets sharing one or two identical entities.

The present disclosure provides a method of processing a text, which extracts a plurality of relational triplets from the text by using the correlation between entity relations.

In an embodiment of the present disclosure, a three-dimensional word relation tensor is used to describe a relation between words in a text. The word relation tensor may reflect the correlation between relations. The correlation of relations may be described more accurately by learning and optimizing the word relation tensor, thereby improving the accuracy of extracting the relational triplet.

Figure 1:
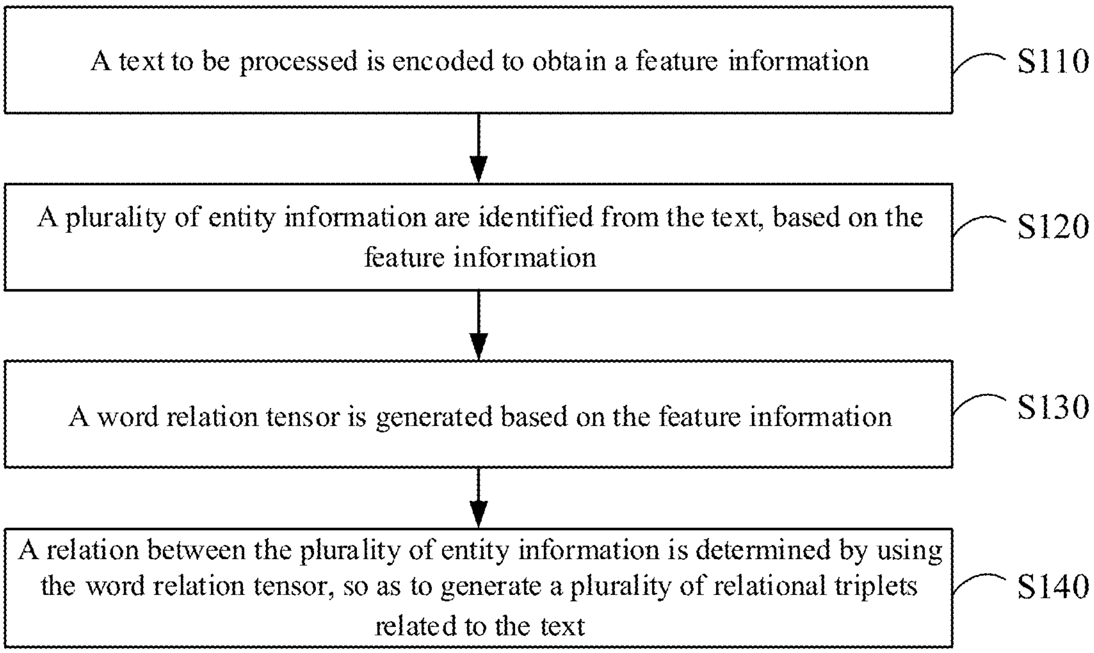
FIG. 1 is a schematic diagram of a flowchart of a method of processing a text according to an embodiment of the present disclosure.

The following describes the method of processing a text provided in the present disclosure in conjunction with FIG. 1.

FIG. 1 is a schematic diagram of a flowchart of a method of processing a text according to an embodiment of the present disclosure.

As shown in FIG. 1, a method 100 of processing a text in this embodiment may include operations S110 to S140.

In operation S110, a text to be processed is encoded to obtain a feature information.

For example, the text to be processed may be a sentence expressed in a textual form. The sentence may include a plurality of characters (or words) and a plurality of punctuation marks. The feature information may represent features for the plurality of characters (or words) and the plurality of punctuation marks in the sentence.

For example, the feature information may be a feature matrix. A multidimensional matrix is used to represent the features for the plurality of characters (or words) and the plurality of punctuation marks.

In operation S120, a plurality of entity information are identified from the text, based on the feature information.

In an embodiment of the present disclosure, the entity information is a phrase used to describe an objectively existing object in the text. For example, in a text in Chinese language "树上有很多苹果 (There are many apples on the tree)", apple and tree are objectively existing entities, so the Chinese characters "苹果 (apples)" in the text are the entity information of the entity apple and the Chinese character "树 (tree)" in the text is the entity information of the entity tree.

In an embodiment of the present disclosure, the entity information describing an entity may be a plurality of words or a single word. For example, in a process of identifying the text "树上有很多苹果", "树" may be used as the entity information to describe the entity, "苹" and "果" cannot be used separately as the entity information to describe the entity, and "苹果" may be used as the entity information to describe the entity. In order to accurately identify the entity information of the text, feature analysis may be carried out using the feature information by taking a single character in the text as an object and taking continuous characters in the text as an object, so as to determine the entity information in form of single character and entity information in form of word in the text.

In operation S130, a word relation tensor is generated based on the feature information.

In an embodiment of the present disclosure, the word relation tensor includes a plurality of relations that may exist between a plurality of entities. For example, the word relation tensor may include a plurality of types of relations pre-defined for the plurality of entities. For example, the relation type may be a membership relation and an inclusion relation.

For example, the word relation tensor is a three-dimensional tensor. For example, the word relation tensor is generated according to two sets of feature information and a learnable relational basis matrix. The two sets of feature information are the feature information of the two entities in the entity pair. The learnable relational basis matrix may represent a plurality of possible relations between the two entities.

For example, the plurality of relations included in the word relation tensor may be obtained through deep learning. For example, in the process of tensor learning, connections between all relation types may be established by sharing some model parameters with all relation types, so as to obtain the word relation tensor. The word relation tensor may reflect the correlation between the plurality of relations.

For example, the relation included in the word relation tensor may also be determined from the text. For example, the feature information includes the entity information and the relation information included in the text. The word relation tensor generated based on the feature information also includes a relation between entities described in the text.

In operation S140, a relation between the plurality of entity information is determined by using the word relation tensor, so as to generate a plurality of relational triplets related to the text.

In an embodiment of the present disclosure, a real relation between each two entities among the plurality of entities is predicted by using the plurality of relations that may exist between the plurality of entities included in the word relation tensor. The predicted relation with the highest reliability is recorded as the real relation between the two entities in the relational triplet corresponding to the two entities.

In the embodiment of the present disclosure, the word relation tensor is generated based on the feature information of the text. The relation between entities is predicted by fully utilizing the correlation between the plurality of relations in the word relation tensor, so as to generate the relational triplet, thereby achieving extracting the relation from the text. In addition, the process of identifying the entity and generating the word relation tensor may be trained through the deep learning model. The accuracy of entity and word relation tensor may be continuously improved by continuously optimizing losses of the processes of identifying the entity and generating the word relation tensor, thereby improving the efficiency of extracting the relational triplet.

Figure 2:
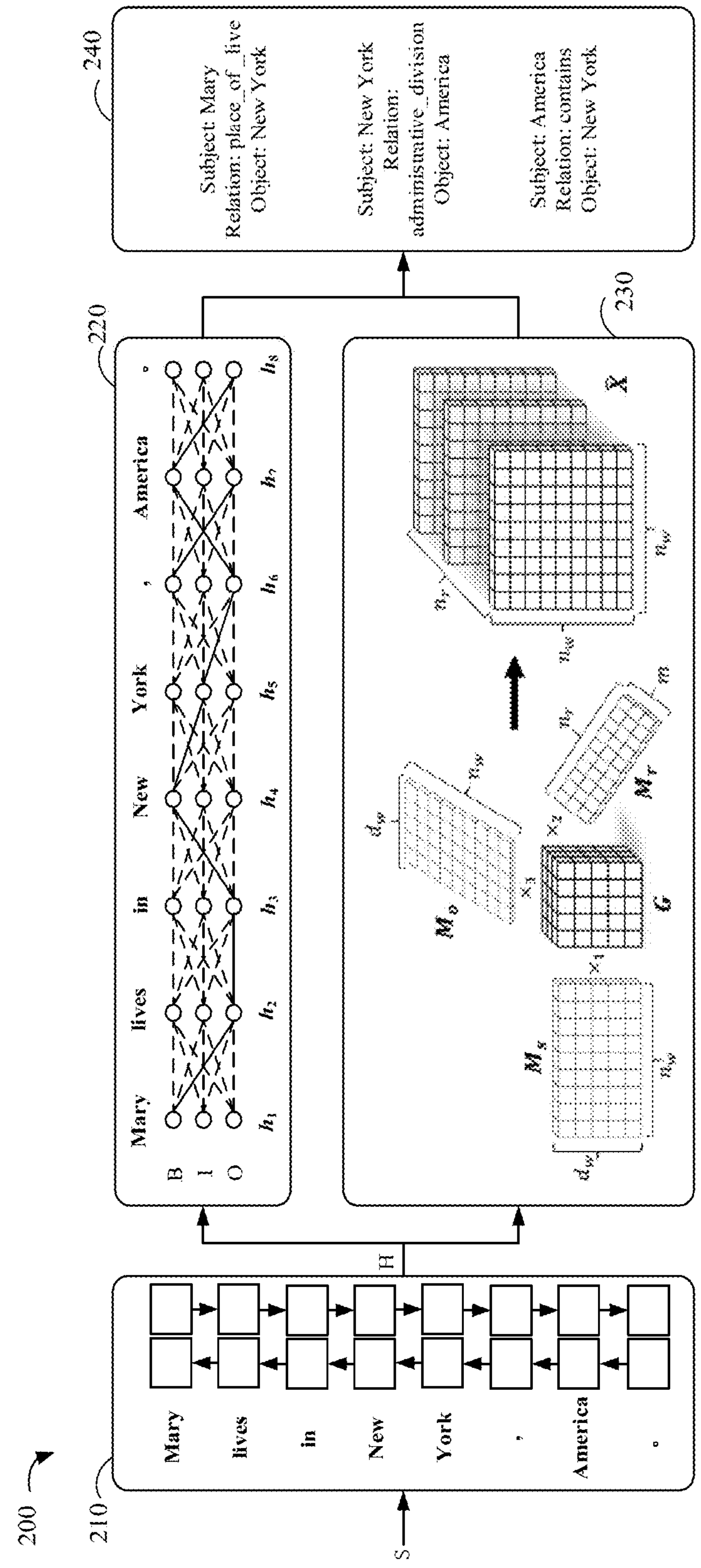
FIG. 2 is a schematic diagram of a principle of a method of processing a text according to an embodiment of the present disclosure.

The following describes the principle of the method of processing a text provided in the present disclosure in conjunction with FIG. 2.

FIG. 2 is a schematic diagram of a principle of a method of processing a text according to an embodiment of the present disclosure.

As shown in FIG. 2, an embodiment 200 is provided. In 210, as a text input to be processed, a sentence S is encoded to obtain the feature information. In 220, entity identification is performed on the sentence S based on the feature information, so as to output a plurality of entities. In 230, a word relation tensor including a plurality of relations is generated based on the feature information. In 240, a plurality of relational triplets included in the sentence S are generated based on the word relation tensor and the plurality of entities.

In some embodiments, encoding a text to be processed to obtain a feature information includes: extracting a plurality of word objects from the text; determining a plurality of word features for the plurality of word objects respectively; and encoding the plurality of word features to obtain the feature information.

In an embodiment of the present disclosure, the word object may be a word or a punctuation mark. For example, assuming that the sentence S is "Mary lives in New York, American.", the word objects extracted from the sentence S include "Mary", "lives", "in", "New", "York", ",", "American", and ".".

For example, the word object may be vectorized, and feature analysis may be performed on each character of each word object to obtain the word feature for each word object.

For example, the sentence S may include word objects $w_i$, where $i=1, \ldots, n_w$, and $n_w$ is a positive integer. $w_i$ represents the i-th word object in the sentence S. For the word object $w_i$, a word vector $$e_i^w$$

may be initialized by using a pre-trained GloVe 840B word vector, and the word object may be vectorized by using the initialized word vector $$e_i^w.$$

A word character level morphological feature $$e_i^c$$

of each word object is acquired by using a Long Short Term Memory (LSTM) network.

For example, the word feature $e_i$ of each word object may be determined by using the following equation (1):

$$e_i = [e_i^w \| e_i^c] \quad \text{Equation (1)}$$

where $$e_i^w$$

is the word vector for the word object $$w_i, e_i^c$$

is the character level morphological feature for the word object $w_i$, and $\|$ is vector concatenation.

In some embodiments, encoding the plurality of word features of the plurality of word objects to obtain the feature information includes: encoding the plurality of word features to obtain a plurality of context information of the plurality of word objects; determining a plurality of hidden features for the plurality of word objects respectively, according to the plurality of context information; and generating the feature information according to the plurality of hidden features.

In an embodiment of the present disclosure, the word feature sequence of the sentence S is encoded by using a bi-directional long-short term memory (BiLSTM) network, so as to generate the context information of each word object. For example, the word feature sequence of the sentence S includes word features $e_i$ corresponding to all word objects in the sentence S, that is, the word feature sequence is $[e_1, \ldots, e_{n_w}]$.

By using the BiLSTM network, the sentence S may be encoded from front to back or from back to front, the dependency relation between the plurality of word objects $w_i$ in the sentence S may be analyzed, and the semantic and grammatical structure of the sentence S may be determined, so as to acquire a plurality of context information of the word object $w_i$. The relation between each word object $w_i$ and consecutive word objects in front of and behind the word object $w_i$ may be determined according to the context information.

For example, information from the previous word object to the next word object in the word feature sequence $[e_1, \ldots, e_{n_w}]$ may be captured by inputting the word feature sequence $[e_1, \ldots, e_{n_w}]$ from left to right into the BiLSTM network. Information from the next word object to the previous word object in the word feature sequence $[e_1, \ldots, e_{n_w}]$ may be captured by inputting the word feature sequence $[e_1, \ldots, e_{n_w}]$ from right to left into the BiLSTM network.

The BiLSTM network includes a plurality of hidden layers for analyzing the semantic and structural features for the plurality of word objects. The hidden feature for each word object in the corresponding hidden layer may be determined based on the context information of each word object.

The feature information may be represented in a form of matrix. For example, a hidden feature sequence may be generated according to the hidden features for the plurality of word objects. The hidden feature sequence is used as the feature information.

For example, the encoding process may be represented by using the following equation (2):

$$\begin{cases} \overrightarrow{h}_i^{l+1} = \overrightarrow{LSTM}^{l+1}\left(\overrightarrow{h}_{i-1}^{l+1}, h_i^l\right) \\ \overleftarrow{h}_i^{l+1} = \overleftarrow{LSTM}^{l+1}\left(h_i^l, \overleftarrow{h}_{i+1}^{l+1}\right) \end{cases} \quad \text{Equation (2)}$$

where $\overrightarrow{\text{LSTM}}$ represents forward propagation LSTM algorithm, $\overleftarrow{\text{LSTM}}$ represents backward propagation LSTM algorithm, $$\overrightarrow{h}_i^{l+1} \text{ and } \overleftarrow{h}_i^{l+1}$$

represents the context information of the word object $w_i$.

For example, the hidden feature for the word object may be determined by using the following equation (3):

$$h_i^{l+1} = \left[\overrightarrow{h}_i^{l+1} \| \overleftarrow{h}_i^{l+1}\right] \quad \text{Equation (3)}$$

where $$h_i^{l+1}$$

is the hidden feature for the word object $w_i$ in the l-th hidden layer, and $$h_i^1 = e_i$$

is defined.

For example, the feature matrix H may be determined by using the following equation (4):

$$H = \left[h_1^{l+1}, \ldots, h_{n_w}^{l+1}\right] \quad \text{Equation (4)}$$

In some embodiments, identifying a plurality of entity information from the text, based on the feature information includes: determining, from a plurality of preset label sequences, a target label sequence corresponding to the feature information; annotating an entity type for each of a plurality of word objects in the text, according to the target label sequence; determining an entity scope according to the entity types of the plurality of word objects, wherein the entity scope indicates a number of word objects included in an entity and position information of the word objects included in the entity in the text; and determining the plurality of entity information of the text according to the entity scope.

In an embodiment of the present disclosure, the plurality of preset label sequences may be predefined. The label sequence indicates the entity type for each word object in the sentence S. For example, the entity type includes, for example, an entity beginning (begin, B), an entity ending (inside, I), and invalid (outside, O). For example, the entity type for each word object in the sentence S may be exhaustively listed by arranging and combining, so as to obtain a label sequence set $Y_s$. The label sequence set $Y_s$ may include all possible label sequences in the sentence S.

In an embodiment of the present disclosure, the target label sequence may be determined from the label sequence set $Y_s$ by using the deep learning model. For example, determining an evaluation value matrix related to labels according to the feature information; determining a plurality of evaluation value functions for the plurality of preset label sequences respectively, according to evaluation value matrices of a plurality of preset labels included in the plurality of preset label sequences; determining a probability of each preset label sequence among the plurality of preset label sequences being selected as the target label sequence, according to the plurality of evaluation value functions; and determining the target label sequence from the plurality of preset label sequences according to the probability.

In an embodiment of the present disclosure, an evaluation value function for the label sequence is constructed based on the feature information of the sentence S, so as to determine the correlation between the entity type in the label sequence and the feature for the word object in the sentence S.

In an embodiment of the present disclosure, an evaluation value matrix V is determined from the feature matrix H by using multi-layer perceptron (MLP).

MLP may merge the features for the plurality of hidden layers included in the feature matrix H. The last layer of MLP is treated as a linear model. The feature matrix H may be transformed into the evaluation value matrix V through MLP, so as to acquire more accurate features in the sentence S.

According to a conditional random field, in a case that only the feature relation between adjacent word objects in the sentence S is considered, the evaluation value function $\beta(\hat{Y})$ for the label sequence may be determined by using the following equation (5):

$$\beta(\hat{Y}) = \sum_{i=1}^{n_w} T_{y_i-1, y_i} + \sum_{i=1}^{n_w} V_{i, y_i} \quad \text{Equation (5)}$$

where $\hat{Y}$ is a potentially selected label sequence, the evaluation value matrix is $V = MLP_v(H)$, and $T_{y_i-1, y_i}$ is a transition evaluation value matrix from the $(y_i-1)$-th label sequence to the $y_i$-th label sequence. An initialization state of the transition evaluation value matrix is pre-defined according to the transformation process for the feature matrix H.

In an embodiment of the present disclosure, determining a probability of each preset label sequence among the plurality of preset label sequences being selected as the target label sequence, according to the plurality of evaluation value functions includes: determining an expected value of the plurality of preset label sequences related to the text, according to the plurality of evaluation value functions; and determining the probability according to a ratio between each of the plurality of evaluation value functions and the expected value.

For example, the probability of each label sequence being selected as the target label sequence may be determined according to the evaluation value of each label sequence and an average evaluation value of all label sequences.

For example, the probability $P(\hat{Y}|S)$ of the label sequence being selected may be determined by using the following equation (6):

$$\begin{cases} P(\hat{Y} \mid S) = \exp(\beta(\hat{Y})) / Z(S) \\ Z(S) = \sum_{\tilde{Y} \in Y_s} \exp(\beta(\tilde{Y})) \end{cases} \quad \text{Equation (6)}$$

where $\tilde{Y}$ is a label sequence in the label sequence set $Y_s$, and Z(S) is the expected value.

In an embodiment of the present disclosure, according to the probability of the label sequence being selected, the label sequence with the highest probability may be determined to be the most reliable and may be selected as the target label sequence.

In an embodiment of the present disclosure, in a case that the deep learning model may be used to determine the target label sequence from the label sequence set $Y_s$, a negative logarithmic likelihood loss function may be used to train the deep learning model. During the training process, the deep learning model is trained with the goal of minimizing the loss.

For example, the deep learning model is trained by using the following equation (7) as the loss function:

$$\mathcal{L}_{ER} = \log Z(S) - \beta(Y) \quad \text{Equation (7)}$$

where Y is the real label (also referred as gold label), and β(Y) is the evaluation value function for the real label.

In an embodiment of the present disclosure, in a case that the target label sequence is determined, instance identification may be performed on the sentence S according to the entity type included in the target label sequence.

For example, the word object $w_1$ of the sentence S is annotated by using the first entity type included in the target label sequence. If it is determined that the entity type for the word object $w_1$ is B, the word object $w_1$ may be added to an entity $et^1$. The entity $et^1$ represents the first entity identified from the sentence S. The word object $w_2$ of the sentence S is annotated by using the second entity type included in the target label sequence. If it is determined that the entity type for the word object $w_2$ is O or B, the entity $et^1$ is added to an entity set E. If it is determined that the entity type for the word object $w_2$ is I, the word object $w_2$ may be added to the entity $et^1$.

For example, the entity scope may be determined when annotating the entity types for consecutive word objects.

For example, in a case where the word object "Mary", the word object "lives", and the word object "in" in the sentence S shown in FIG. 2 are annotated with B, O, and O respectively, such an entity scope may be determined that the first entity includes the first word object "Mary".

For example, in a case where the word object "New", the word object "York", and the word object "," are annotated with B, I, and O respectively, such an entity scope may be determined that the second entity includes the fourth word object "New" to the fifth word object "York".

In some embodiments, generating a word relation tensor based on the feature information includes: determining a word feature matrix according to the feature information; and generating the word relation tensor according to the word feature matrix.

In an embodiment of the present disclosure, the feature matrix H may be transformed into two word feature matrices $M_s=MLP_s(H)$ and $M_o=MLP_o(H)$. $M_s=MLP_s(H)$ represents a word feature matrix when all entities in the sentence S are head entities. $M_o=MLP_o(H)$ represents a word feature matrix when all entities in the sentence S are tail entities. The feature matrix H is transformed into the word feature matrix $M_s$ for head entity and the word feature matrix $M_o$ for tail entity through MLP, so that the word feature matrix $M_s$ for head entity and the word feature matrix $M_o$ for tail entity may be used to more accurately describe the features for the head and tail entities in the entity pair.

In an embodiment of the present disclosure, a three-dimensional word relation tensor may be generated by using the word feature matrix $M_s$ for head entity and the word feature matrix $M_o$ for tail entity. The relation between the head entity and the tail entity may be more accurately represented by using the word relation tensor.

For example, determining the word relation tensor according to the word feature matrices $M_s$ and $M_o$ may include: constructing a relation core tensor, wherein the relation core tensor includes a plurality of relational basis matrices; generating a relation feature matrix according to a modular product between a preset relational weight matrix and the relation core tensor; and generating the word relation tensor according to the relation feature matrix and the word feature matrix.

In an embodiment of the present disclosure, the relation core tensor G may include a plurality of predefined relations. The relation core tensor G is obtained by superimposing m learnable relational basis matrices. For example, the relational core tensor G may include m relation feature matrices, $G \in \mathbb{R}^{d_w \times m \times d_w}$. The relational weight matrix $M_r$ represents the weights of the plurality of relations included in the relation core tensor G, the weights being related to the entity pairs, where $M_r \in \mathbb{R}^{n_r \times m}$, $d_w$, m and $n_r$ are positive integers, $d_w$ is a dimension of the word feature matrix, and $n_r$ is the number of predefined relations included in the relation core tensor G.

Both the parameters of the relational weight matrix $M_r$ and the parameters of the relation core tensor G are learnable. The parameters of the relational weight matrix $M_r$ and the relation core tensor G may be optimized by deep learning.

For example, the word relation tensor may be output from the deep learning model after inputting the word feature matrix into the deep learning model.

For example, an activation function is constructed by using the following equation (8) to determine the relation feature matrix $\mathcal{F}$ and the word relation tensor $\hat{X}$:

$$\begin{cases} \mathcal{F} = G \times_2 M_r \\ \hat{X} = \sigma(\mathcal{F} \times_1 M_s \times_3 M_o \end{cases} \quad \text{Equation (8)}$$

where $\sigma(\,)$ is the activation function, and $\times_n$ represents n modular product of tensors.

In an embodiment of the present disclosure, the feature matrix for each relation included in the relation feature matrix $\mathcal{F}$ is the weighted sum of the relational basis matrices in the relation core tensor G.

In an embodiment of the present disclosure, the word relation tensor $\hat{X}$ is represented in the form of Tucker decomposition, i.e. the word relation tensor $\hat{X}$ is represented as the modular product between the core tensor and a plurality of matrices. This enables in the deep learning process of tensors, connections between all relations may be established by sharing some model parameters (core tensors) with all relation types, so as to learn the correlation between the relations in a tensor learning task.

In some embodiments, determining a relation between the plurality of entity information according to the plurality of word relation tensors, so as to obtain a plurality of relational triplets includes: generating a plurality of entity pairs according to the plurality of entity information, wherein the entity pair includes two entities indicated by any two entity information among the plurality of entity information; generating the plurality of relational triplets according to the plurality of entity pairs and corresponding relations, in a case that a correlation between the plurality of entity pairs and a plurality of relations included in the word relation tensor meets a preset condition.

In an embodiment of the present disclosure, the entity pair is generated by any two entities among the plurality of entities without duplicate selection. For example, 3 entity pairs may be generated for 3 entities.

In an embodiment of the present disclosure, the word relation tensor is traversed according to a plurality of positions where the word objects included in the head and tail entities of the entity pair are located in the sentence S, so as to obtain a plurality of relations corresponding to the plurality of positions in the word relation tensor. The target condition that satisfies the correlation condition with the entity pair is determined from the plurality of relations.

For example, the word object included in the head entity is located at the first position in the sentence S, while the word objects included in the tail entity are located at fourth and fifth positions in the sentence S. The three-dimensional word relation tensor is $\hat{X}\in\mathbb{R}^{d_w\times n_r\times d_w}$. The tensor elements located at (1, 1, 4), . . . , (1, k, 4), . . . , (1, $n_r$, 4), as well as (1, 1, 5), . . . , (1, k, 5), . . . , (1, $n_r$, 5) in the three-dimensional word relation tensor are acquired, where k=1, . . . , $n_r$. $2n_r$ tensor elements represent $n_r$ relations. For example, the tensor elements located at (1, k, 4) and (1, k, 5) are used to represent the k-th relation corresponding to the entity pair.

A relation having a correlation to the entity pair that satisfies the preset condition is determined from $n_r$ relations corresponding to the entity pair.

For example, generating the plurality of relational triplets according to the plurality of entity pairs and corresponding relations, in a case that a correlation between the plurality of entity pairs and a plurality of relations included in the word relation tensor meets a preset condition, includes: for each entity pair, acquiring two entity length information of two entities in the entity pair; determining a plurality of correlation values between the entity pair and the plurality of relations, according to the two entity length information and the word relation tensor; and generating at least one relational triplet according to at least one relation corresponding to the at least one correlation value and the entity pair, in a case that at least one correlation value among the plurality of correlation values is greater than or equal to a preset threshold.

For example, in a case that tensor elements for the plurality of relations corresponding to the entity pair are obtained, the correlation between the entity pair and the plurality of relations may be calculated according to the length of the entity pair and the sum of tensor elements of each relation.

For example, a head entity of an entity pair ($et^i$, $et^j$) ($et^i=\{w_{i_f}, \ldots, w_{i_l}\}$, $et^j=\{w_{j_f}, \ldots, w_{j_l}\}$ is $et^i$, and a tail entity of the entity pair is $et^j$. The word objects included in the head entity $et^i$ are $w_{i_f}, \ldots, w_{i_l}$. The word objects included in the tail entity $et^j$ are $w_{j_f}, \ldots, w_{j_l}$, where $w_{i_f}$ represents the first word object in the head entity $et^i$, $w_{i_l}$ represents the last word object in the head entity $et^i$, $w_{j_f}$ represents the first word object in the tail entity $et^j$, and $w_{j_l}$ represents the last word object in the tail entity $et^j$.

For example, the correlation between the entity pair and $n_r$ relations may be determined by using the following equation (9):

$$\frac{1}{l_i l_j}\cdot\left(\sum_{u=i_f}^{i_l}\sum_{v=j_f}^{j_l}\hat{X}_{ukv}\right)\geq\delta \qquad \text{Equation (9)}$$

where $\hat{X}_{ukv}$ is the tensor element in the word relation tensor $\hat{X}$, $\delta$ is the threshold, $l_i$ represents the length of the head entity $et^i$, and $l_j$ represents the length of the tail entity $et^j$.

For example, the entity length information may be determined by using the following equation (10):

$$\begin{cases} l_i = i_l - i_f + 1 \\ l_j = j_l - j_f + 1 \end{cases} \qquad \text{Equation (10)}$$

For example, as shown in FIG. 2, the length of the head entity "Mary" is 1−1+1=1, and the length of the tail entity "New York" is 5−4+1=2.

For example, for the head entity "Mary" and the tail entity "New York", a sum A of the tensor element $\tilde{X}_{1k4}$ located at (1, k, 4) and the tensor element $\hat{X}_{1k5}$ located at (1, k, 5), as well as a product B of the length of the head entity "Mary" and the length of the tail entity "New York", are determined. The correlation between the k-th relation $r_k$ and the entity pair "Mary-New York" is determined by comparing the ratio of A to B with a threshold $\delta$. For example, when it is determined that the ratio of A to B is greater than or equal to the threshold $\delta$, the k-th relation $r_k$ may be determined as the relation information of the entity pair "Mary-New York", and a relational triplet (Mary, $r_k$, New York) is generated. For example, when it is determined that the fifth relation $r_5$ also satisfies the above relation, a relational triplet (Mary, $r_5$, New York) may be generated.

The relational triplet (Mary, $r_k$, New York) and the relational triplet (Mary, $r_5$, New York) may be recorded in the relational triplet set $T_s$, so that the relational triplets may be applied to tasks such as knowledge graphs, question answering systems, and dialogue systems.

For example, as shown in FIG. 2, the output relational triplets may include (Mary,: place_of_live, New York), (New York, administrative_division, America), and (America, contains, New York).

Through the embodiment of the present disclosure, the word relation matrix is constructed by using the plurality of predetermined relations and the word feature matrix corresponding to the text. The word relation matrix may represent the correlation between relations. The relation between the entity pair is determined by using the word relation matrix, which may fully utilize the correlation between relations, thereby improving the accuracy of relation extraction.

The present disclosure further provides a method of training a deep learning model, which will be described in detail below in conjunction with FIG. 3.

Figure 3:
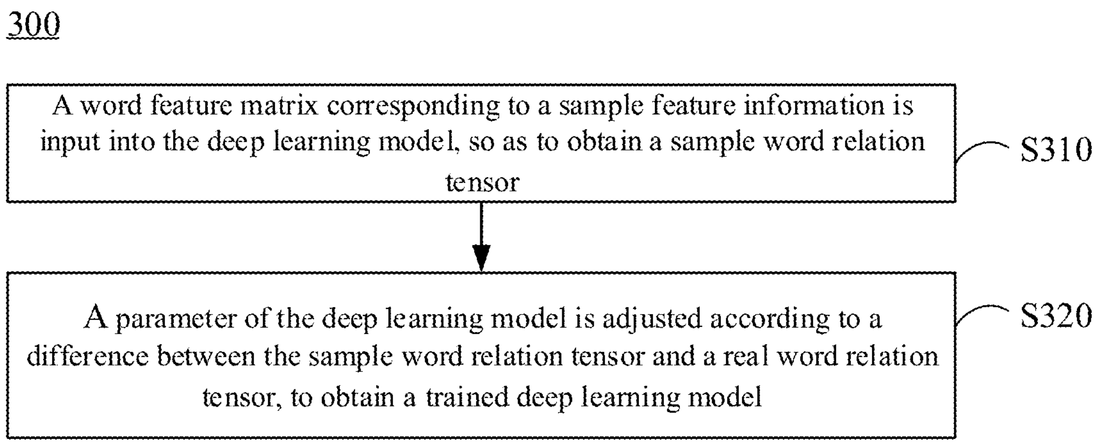
FIG. 3 is a schematic diagram of a flowchart of a method of training a deep learning model according to an embodiment of the present disclosure.

FIG. 3 is a schematic diagram of a flowchart of a method of training a deep learning model according to an embodiment of the present disclosure.

As shown in FIG. 3, a method 300 of training a deep learning model in this embodiment may include operations S310 to S320.

In operation S310, a word feature matrix corresponding to a sample feature information is input into the deep learning model, so as to obtain a sample word relation tensor.

In operation S320, a parameter of the deep learning model is adjusted according to a difference between the sample word relation tensor and a real word relation tensor, to obtain a trained deep learning model.

According to an embodiment of the present disclosure, the sample text is encoded to obtain the sample feature information. The sample feature information is input into the deep learning model in the form of a matrix.

The deep learning model is trained, by using the sample word relation tensor as a predicted tensor and the real word relation tensor as a real tensor (also referred as gold tensor), to optimize the parameter of the deep learning model, thereby reducing the difference between the sample word relation tensor and the real word relation tensor.

In some embodiments, in operation S310, inputting a word feature matrix corresponding to a sample feature information into the deep learning model, so as to obtain a sample word relation tensor may include: constructing a sample relation core tensor according to a plurality of preset sample relations, wherein the sample relation core tensor includes a plurality of sample relational basis matrices corresponding to a plurality of sample relations; generating a sample relation feature matrix according to a modular product between a preset sample relational weight matrix and the sample relation core tensor; and determining the sample word relation tensor according to the sample relation feature matrix and a sample word feature matrix.

In an embodiment of the present disclosure, the preset sample relation may be a pre-defined sample relation. The relation core tensor is obtained by superimposing the plurality of learnable relational basis matrices. For example, the relation core tensor may include the plurality of relation feature matrices. The relational weight matrix represents the weights of the plurality of relations included in the relation core tensor, the weight being related to the entity pair. The parameters of the relational weight matrix and the parameters of the relation core tensor are both learnable. The parameters of the relational weight matrix and the relation core tensor may be continuously adjusted by training the deep learning model.

For example, the sample word relation tensor may be determined by the equation (8) above.

In some embodiments, in operation S320, adjusting a parameter of the deep learning model according to a difference between the sample word relation tensor and a real word relation tensor, to obtain a trained deep learning model may include: determining a focus loss function according to the sample word relation tensor; determining an exponential function according to the real word relation tensor; determining a model loss function according to the focus loss function and the exponential function; and adjusting the parameter of the deep learning model according to the model loss function, to obtain the trained deep learning model.

In an embodiment of the present disclosure, in a case of imbalanced distribution of positive and negative samples included in the sample word relation tensor, the deep learning model is difficult to fit positive samples, which reduces the accuracy of predicting positive samples. The model training method provided in the present disclosure improves the learning ability of the deep learning model on positive samples by introducing an exponential function and a focus loss function, so as to solve the above problem.

For example, the exponential function is used to assign different weights to positive and negative samples in the real word relation tensor, so as to achieve a balanced distribution of positive and negative samples.

For example, the focus loss function is used to focus on positive samples in the sample word relation tensor, so that the training direction for the deep learning model is more focused on improving the predictive ability on positive samples.

In some embodiments, determining an exponential function according to the real word relation tensor includes: acquiring a real positive sample and a real negative sample from the real word relation tensor, wherein each of the real positive sample and the real negative sample indicates a real relation; assigning weights to the real positive sample and the real negative sample respectively, according to a number of real positive samples and a number of real negative samples; and determining the exponential function according to the weights.

In an embodiment of the present disclosure, due to the uneven distribution between real positive samples and real negative samples, different weights may be assigned to real positive samples and real negative samples respectively according to the number of real positive samples and real negative samples.

During the training process, due to the small number of real positive samples, a larger weight may be assigned to the real positive samples and a smaller weight may be assigned to the real negative samples, so as to balance the number of real positive samples and real negative samples.

For example, the exponential function ϕ(x) is determined by using the following equation (11):

$$\phi(x) = \begin{cases} \alpha & \text{if } x = 0 \\ 1 - \alpha & \text{if } x = 1 \end{cases} \quad \text{Equation (11)}$$

where x=1 is the real positive sample, x=0 is the real negative sample, a is a hyper parameter for balancing the weights of positive and negative samples, a is a positive number less than 0.5.

In an embodiment of the present disclosure, the positive sample may be considered as samples with rare labels, while negative samples may be considered as samples with common labels. The difficulty of predicting positive samples is usually greater than that of predicting negative samples. By introducing the focus loss function, the training of the model is focused on optimizing the training of positive samples.

For example, the focus loss function 1*f*(x) is determined by using the following equation (12):

$$l_f(x) = (1 - x)^{\gamma} \log(x) \quad \text{Equation (12)}$$

where $\gamma$ is a focus hyper parameter. The attention for the deep learning model to simple and difficult predicted samples may be balanced by using the focus hyper parameter.

In an embodiment of the present disclosure, the parameter of the deep learning model may be optimized by using the focus loss function $l_f(x)$ and the exponential function $\phi(x)$ to minimize the loss function of the model.

For example, the model loss function is determined by using the following equation (13):

$$\mathcal{L}_{TL} = \sum_{u=1}^{n_w} \sum_{k=1}^{n_r} \sum_{v=1}^{n_w} \phi(X_{ukv}) \cdot l_f(\hat{X}_{ukv}^t) \quad \text{Equation (13)}$$

where $X_{ukv}$ is the tensor element of the real word relation tensor X.

$$\hat{X}_{ukv}^t = \begin{cases} \hat{X}_{ukv} & \text{if } X_{ukv} = 1 \\ 1 - \hat{X}_{ukv} & \text{if } X_{ukv} = 0 \end{cases},$$

wherein $\hat{X}_{ukv}$ is the tensor element of the sample word relation tensor $\hat{X}$.

In some embodiments, the total loss function is determined by using the following equation (14):

$$\mathcal{L} = \lambda_1 \mathcal{L}_{ER}(S) + \lambda_2 \mathcal{L}_{TL}(S) \quad \text{Equation (14)}$$

where $\mathcal{L}_{ER}$ is a loss of an entity identification module, $\mathcal{L}_{TL}$ is a loss of a tensor learning module, and $\lambda_1$ and $\lambda_2$ are two hyper parameters used to balance the weights of entity identification and tensor learning. For example, $\lambda_1$ and $\lambda_2$ may both be 0.5.

In an embodiment of the present disclosure, the losses of the deep learning models for entity identification and tensor learning are minimized by training the two deep learning models, so as to improve the ability of entity identification and tensor learning, thereby improving the efficiency and accuracy of relation extraction.

Through the method of training the deep learning model provided in the present disclosure, the process of extracting relations of the entity pair is transformed into a tensor learning model. By training the deep learning model, the deep learning model may output the word relation tensor that is close to the real word relation tensor, thereby improving the accuracy of relation extraction.

Based on the method of processing a text provided in the present disclosure, the present disclosure further provides a method of generating a knowledge graph, which will be described in detail in conjunction with FIG. 4 below.

Figure 4:
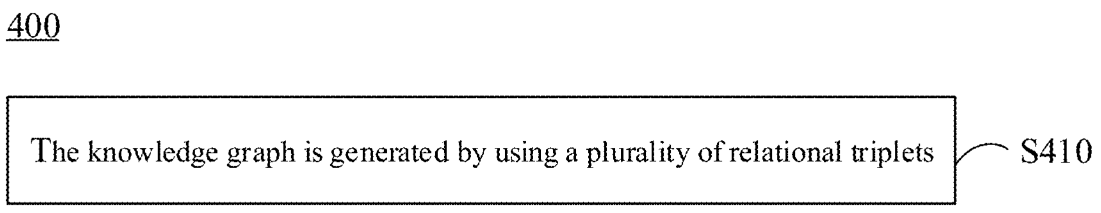
FIG. 4 is a schematic diagram of a flowchart of a method of generating a knowledge graph according to an embodiment of the present disclosure.

FIG. 4 is a schematic diagram of a flowchart of a method of generating a knowledge graph according to an embodiment of the present disclosure.

As shown in FIG. 4, a method 400 of generating a knowledge graph in this embodiment may include an operation S410.

In operation S410, the knowledge graph is generated by using a plurality of relational triplets.

According to an embodiment of the present disclosure, the plurality of relational triplets are generated by using the method of processing the text described above.

In an embodiment of the present disclosure, through the method of generating the knowledge graph obtained by the method of processing the text provided in the present disclosure, more accurate relational triplets may be acquired by fully utilizing the correlation between relations of the entity pair, so as to generate a knowledge graph that may include more complete information.

Based on the method of training a deep learning model provided in the present disclosure, the present disclosure further provides a method of generating a knowledge graph, which will be described in detail in conjunction with FIG. 5 below.

Figure 5:
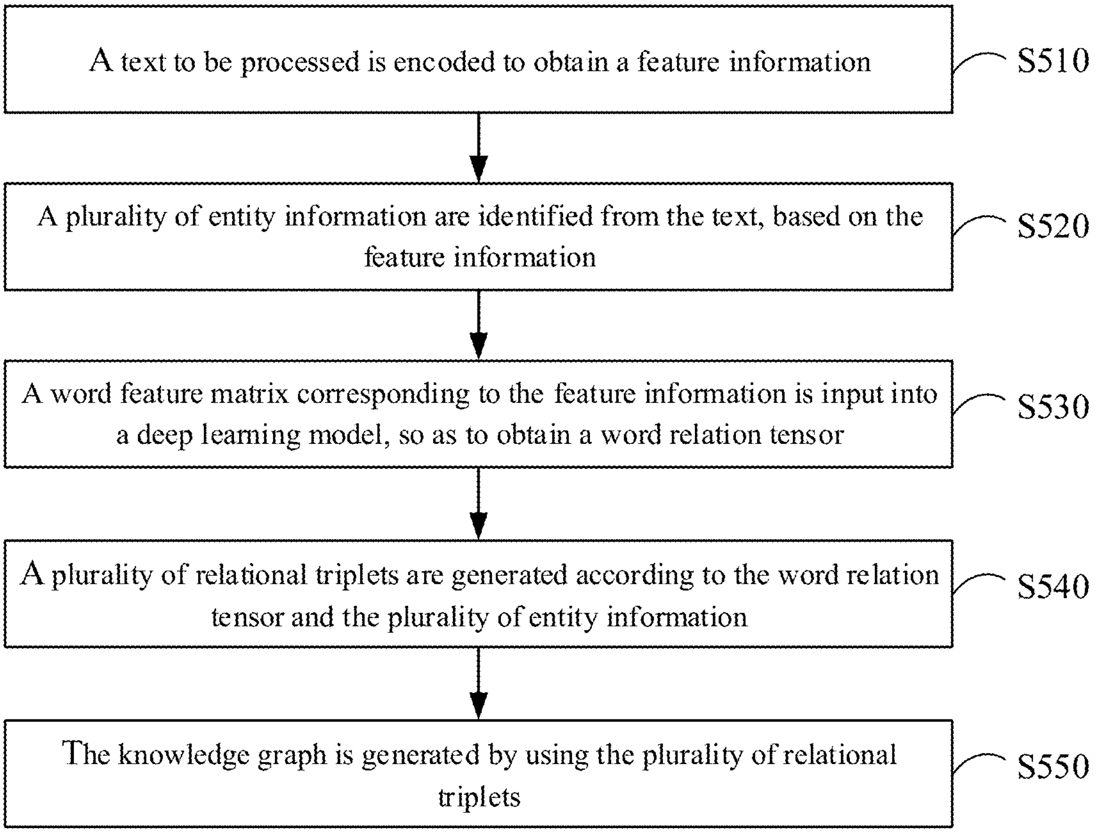
FIG. 5 is a schematic diagram of a flowchart of a method of generating a knowledge graph according to another embodiment of the present disclosure.

FIG. 5 is a schematic diagram of a flowchart of a method of generating a knowledge graph according to another embodiment of the present disclosure.

As shown in FIG. 5, a method 500 of generating a knowledge graph in this embodiment may include operations S510 to S550.

In operation S510, a text to be processed is encoded to obtain a feature information.

Then, in operation S520, a plurality of entity information are identified from the text, based on the feature information.

Then, in operation S530, a word feature matrix corresponding to the feature information is input into a deep learning model, so as to obtain a word relation tensor.

Then, in operation S540, a plurality of relational triplets are generated according to the word relation tensor and the plurality of entity information.

Then, in operation S550, the knowledge graph is generated by using the plurality of relational triplets.

According to an embodiment of the present disclosure, the deep learning model is trained through the method of training the deep learning model described above.

In an embodiment of the present disclosure, the method of training the deep learning model is similar to the method shown in FIG. 3, which will not be repeated here.

Figure 6:
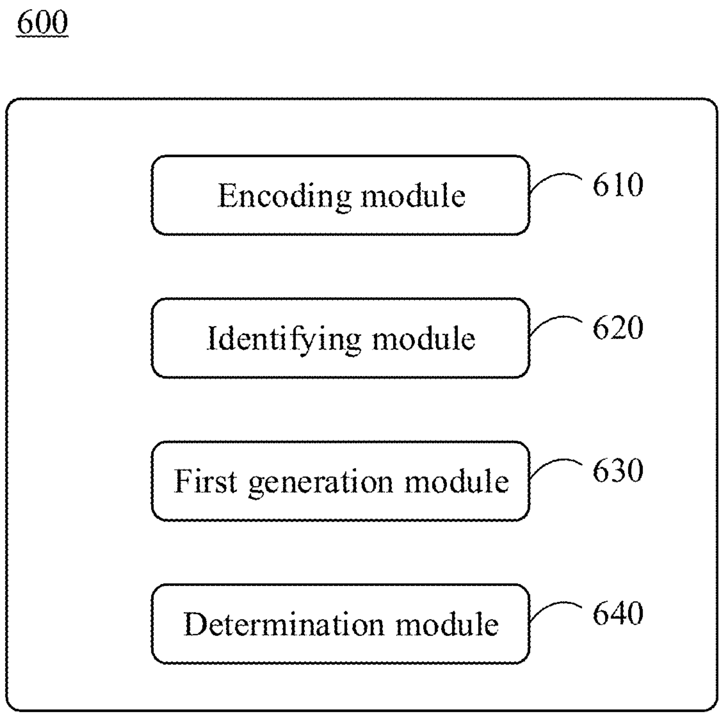
FIG. 6 is a structural block diagram of an apparatus of processing a text according to an embodiment of the present disclosure.

FIG. 6 is a structural block diagram of an apparatus of processing a text according to an embodiment of the present disclosure.

As shown in FIG. 6, an apparatus 600 of processing a text in this embodiment may include an encoding module 610, an identifying module 620, a first generation module 630, and a determination module 640.

The encoding module 610 is used to encode a text to be processed to obtain a feature information. In one embodiment, the encoding module 610 may be used to implement the operation S110 described above, which will not be repeated here.

The identifying module 620 is used to identify a plurality of entity information from the text, based on the feature information. In one embodiment, the identifying module 620 may be used to implement the operation S120 described above, which will not be repeated here.

The first generation module 630 is used to generate a word relation tensor based on the feature information. In one embodiment, the first generation module 630 may be used to implement the operation S130 described above, which will not be repeated here.

The determination module 640 is used to determine a relation between the plurality of entity information by using the word relation tensor, so as to generate a plurality of relational triplets. In one embodiment, the determination module 640 may be used to implement the operation S140 described above, which will not be repeated here.

According to an embodiment of the present disclosure, the encoding module 610 is further used to extract a plurality of word objects from the text; determine a plurality of word features for the plurality of word objects respectively; and encode the plurality of word features to obtain the feature information.

According to an embodiment of the present disclosure, the encoding module 610 is further used to encode the plurality of word features to obtain a plurality of context information of the plurality of word objects; determine a plurality of hidden features for the plurality of word objects respectively, according to the plurality of context information; and generate the feature information according to the plurality of hidden features.

According to an embodiment of the present disclosure, the identifying module 620 is further used to determine, from a plurality of preset label sequences, a target label sequence corresponding to the feature information; annotate an entity type for each of a plurality of word objects in the text, according to the target label sequence; determine an entity scope according to the entity types of the plurality of word objects, wherein the entity scope indicates a number of word objects included in an entity and position information of the word objects included in the entity in the text; and determine the plurality of entity information of the text according to the entity scope.

According to an embodiment of the present disclosure, the identifying module 620 is further used to determine an evaluation value matrix related to labels according to the feature information; determine a plurality of evaluation value functions for the plurality of preset label sequences respectively, according to evaluation value matrices of a plurality of preset labels included in the plurality of preset label sequences; determine a probability of each preset label sequence among the plurality of preset label sequences being selected as the target label sequence, according to the plurality of evaluation value functions; and determine the target label sequence from the plurality of preset label sequences according to the probability.

According to an embodiment of the present disclosure, the identifying module 620 is further used to determine an expected value of the plurality of preset label sequences related to the text, according to the plurality of evaluation value functions; and determine the probability according to a ratio between each of the plurality of evaluation value functions and the expected value.

According to an embodiment of the present disclosure, the first generation module 630 is further used to determine a word feature matrix according to the feature information; and generate the word relation tensor according to the word feature matrix.

According to an embodiment of the present disclosure, the first generation module 630 is further used to construct a relation core tensor, wherein the relation core tensor includes a plurality of relational basis matrices; generate a relation feature matrix according to a modular product between a preset relational weight matrix and the relation core tensor; and generate the word relation tensor according to the relation feature matrix and the word feature matrix.

According to an embodiment of the present disclosure, the determination module 640 is further used to generate a plurality of entity pairs according to the plurality of entity information, wherein the entity pair includes two entities indicated by any two entity information among the plurality of entity information; generate, in a case that a correlation between the plurality of entity pairs and a plurality of relations included in the word relation tensor meets a preset condition, the plurality of relational triplets according to the plurality of entity pairs and corresponding relations.

According to an embodiment of the present disclosure, the determination module 640 is further used to for each entity pair, acquire two entity length information of two entities in the entity pair; determine a plurality of correlation values between the two entity length information and the plurality of relations, according to the two entity length information and the word relation tensor; and generate, in a case that at least one correlation value among the plurality of correlation values is greater than or equal to a preset threshold, at least one relational triplet according to at least one relation corresponding to the at least one correlation value and the entity pair.

Based on the method of training a deep learning model provided in the present disclosure, the present disclosure further provides an apparatus of training a deep learning model, which will be described in detail in conjunction with FIG. 7 below.

Figure 7:
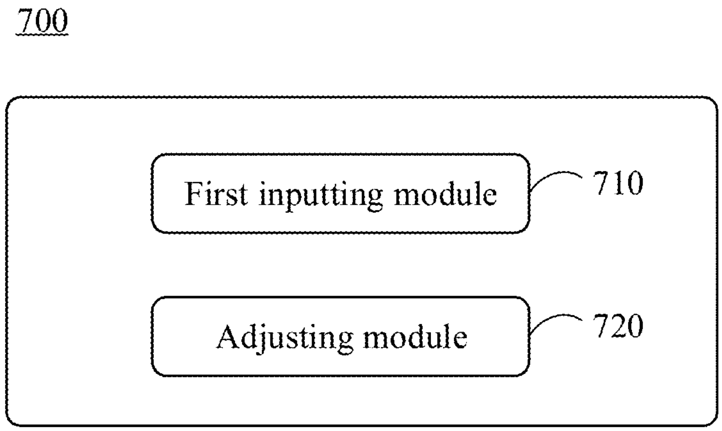
FIG. 7 is a structural block diagram of an apparatus of training a deep learning model according to an embodiment of the present disclosure.

FIG. 7 is a structural block diagram of an apparatus of training a deep learning model according to an embodiment of the present disclosure.

As shown in FIG. 7, an apparatus 700 of training a deep learning model in this embodiment may include a first inputting module 710 and an adjusting module 720.

The first inputting module 710 is used to input a word feature matrix corresponding to a sample feature information into the deep learning model, so as to obtain a sample word relation tensor. In one embodiment, the first inputting module 710 may be used to implement the operation S310 described above, which will not be repeated here.

The adjusting module 720 is used to adjust a parameter of the deep learning model according to a difference between the sample word relation tensor and a real word relation tensor, to obtain a trained deep learning model. In one embodiment, the adjusting module 720 may be used to implement the operation S320 described above, which will not be repeated here.

According to an embodiment of the present disclosure, the first inputting module 710 is further used to construct a sample relation core tensor according to a plurality of sample relations, wherein the sample relation core tensor includes a plurality of sample relational basis matrices corresponding to a plurality of sample relations; generate a sample relation feature matrix according to a modular product between a preset sample relational weight matrix and the sample relation core tensor; and determine the sample word relation tensor according to the sample relation feature matrix and a sample word feature matrix.

According to an embodiment of the present disclosure, the adjusting module 720 is further used to determine a focus loss function according to the sample word relation tensor; determine an exponential function according to the real word relation tensor; determine a model loss function according to the focus loss function and the exponential function; and adjust the parameter of the deep learning model according to the model loss function, to obtain the trained deep learning model.

According to an embodiment of the present disclosure, the adjusting module 720 is further used to acquire a real positive sample and a real negative sample from the real word relation tensor, wherein each of the real positive sample and the real negative sample indicates a real relation; assign weights to the real positive sample and the real negative sample respectively, according to a number of real positive samples and a number of real negative samples; and determine the exponential function according to the weights.

Based on the method of generating a knowledge graph provided in the present disclosure, the present disclosure further provides an apparatus of generating a knowledge graph, which will be described in detail in conjunction with FIG. 8 below.

Figure 8:
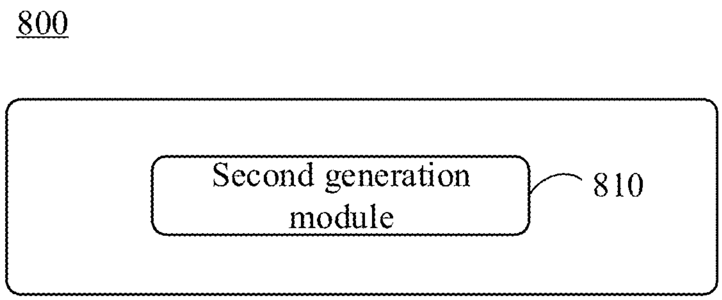
FIG. 8 is a structural block diagram of an apparatus of generating a knowledge graph according to an embodiment of the present disclosure.

FIG. 8 is a structural block diagram of an apparatus of generating a knowledge graph according to an embodiment of the present disclosure.

As shown in FIG. 8, an apparatus 800 of generating a knowledge graph in this embodiment may include a second generation module 810.

The second generation module 810 is used to generate the knowledge graph by using a plurality of relational triplets; wherein the plurality of relational triplets are generated by the apparatus of processing a text provided by the embodiments of the present disclosure. In one embodiment, the second generation module 810 may be used to implement the operation S410 described above, which will not be repeated here.

Based on the method of generating a knowledge graph provided in the present disclosure, the present disclosure further provides an apparatus of generating a knowledge graph, which will be described in detail in conjunction with FIG. 9 below.

Figure 9:
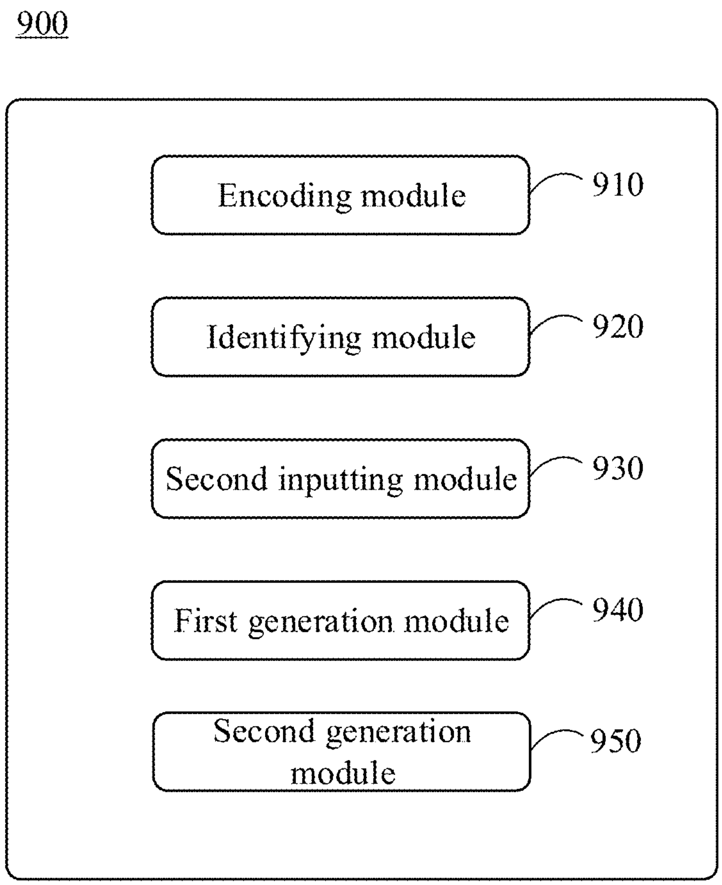
FIG. 9 is a structural block diagram of an apparatus of generating a knowledge graph according to another embodiment of the present disclosure.

FIG. 9 is a structural block diagram of an apparatus of generating a knowledge graph according to another embodiment of the present disclosure.

As shown in FIG. 9, an apparatus 800 of generating a knowledge graph in this embodiment may include an encoding module 910, an identifying module 920, a second inputting module 930, a first generation module 940, and a second generation module 950.

The encoding module 910 is used to encode a text to be processed to obtain a feature information. In one embodiment, the encoding module 910 may be used to implement the operation S510 described above, which will not be repeated here.

The identifying module 920 is used to identify a plurality of entity information from the text, based on the feature information. In one embodiment, the identifying module 920 may be used to implement the operation S520 described above, which will not be repeated here.

The second inputting module 930 is used to input a word feature matrix corresponding to the feature information into a deep learning model, so as to obtain a word relation tensor. In one embodiment, the second inputting module 930 may be used to implement the operation S530 described above, which will not be repeated here. The deep learning model is trained through the apparatus of training the deep learning model provided in the embodiment of the present disclosure.

The first generation module 940 is used to generate a plurality of relational triplets according to the word relation tensor and the plurality of entity information. In one embodiment, the first generation module 940 may be used to implement the operation S540 described above, which will not be repeated here.

The second generation module 950 is used to generate the knowledge graph by using the plurality of relational triplets. In one embodiment, the second generation module 950 may be used to implement the operation S550 described above, which will not be repeated here.

It should be noted that, in technical solutions of the present disclosure, a collection, a storage, a use, a processing, a transmission, a provision, a disclosure, an application and other processing of user personal information involved comply with provisions of relevant laws and regulations, and necessary confidentiality measures have been taken, and do not violate public order and good custom. In technical solutions of the present disclosure, the authorization or consent of the user is acquired before the user personal information is acquired or collected.

According to an embodiment of the present disclosure, the present disclosure further provides an electronic device, a readable storage medium, and a computer program product.

Figure 10:
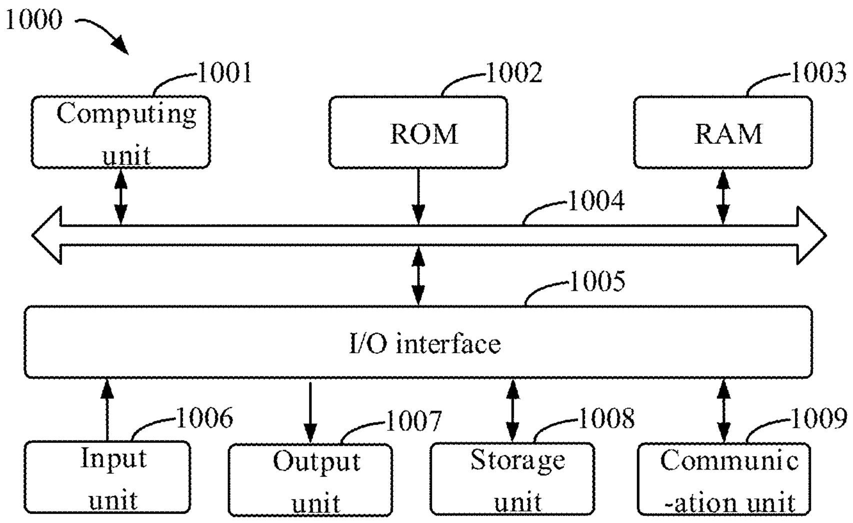
FIG. 10 is a schematic block diagram of an electronic device used to implement an embodiment of the present disclosure.

FIG. 10 shows a schematic block diagram of an exemplary electronic device 1000 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relations, and functions thereof are merely examples, and are not intended to limit the implementation of the present disclosure described and/or required herein.

As shown in FIG. 10, the device 1000 may include a computing unit 1001, which may perform various appropriate actions and processing based on a computer program stored in a read-only memory (ROM) 1002 or a computer program loaded from a storage unit 1008 into a random access memory (RAM) 1003. Various programs and data required for the operation of the device 1000 may be stored in the RAM 1003. The computing unit 1001, the ROM 1002 and the RAM 1003 are connected to each other through a bus 1004. An input/output (I/O) interface 1005 is further connected to the bus 1004.

Various components in the device 1000, including an input unit 1006 such as a keyboard, a mouse, etc., an output unit 1007 such as various types of displays, speakers, etc., a storage unit 1008 such as a magnetic disk, an optical disk, etc., and a communication unit 1009 such as a network card, a modem, a wireless communication transceiver, etc., are connected to the I/O interface 1005. The communication unit 1009 allows the device 1000 to exchange information/data with other devices through a computer network such as the Internet and/or various telecommunication networks.

The computing unit 1001 may be various general-purpose and/or special-purpose processing components with processing and computing capabilities. Some examples of the computing unit 1001 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1001 may perform the various methods and processes described above, such as at least one of the method of processing a text, the method of training a deep learning model, and the method of generating a knowledge graph. For example, in some embodiments, at least one of the method of processing a text, the method of training a deep learning model, and the method of generating a knowledge graph may be implemented as a computer software program that is tangibly contained on a machine-readable medium, such as a storage unit 1008. In some embodiments, part or all of a computer program may be loaded and/or installed on the device 1000 via the ROM 1002 and/or the communication unit 1009. When the computer program is loaded into the RAM 1003 and executed by the computing unit 1001, one or more steps of at least one of the method of processing a text, the method of training a deep learning model, and the method of generating a knowledge graph described above may be performed. Alternatively, in other embodiments, the computing unit 1001 may be used to perform at least one of the method of processing a text, the method of training a deep learning model, and the method of generating a knowledge graph in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices such as at least one of the apparatus of training a deep learning model, the apparatus of determining heat exchange characteristic data, the control apparatus based on heat exchange characteristic data, and the annealing apparatus, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relation between the client and the server is generated through computer programs running on the corresponding computers and having a client-server relation with each other. The server may be the cloud server, also referred to as the cloud computing server or the cloud host, which is the host product in the cloud computing service system to solve shortcomings of difficult management and weak business scalability in a conventional physical host and a VPS (Virtual Private Server) service. The server may also be a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of recognizing a text, comprising:

receiving a text to be processed;

encoding the text to be processed to obtain a feature information;

identifying a plurality of entities from the text, based on the feature information;

generating a word relation tensor comprising a plurality of types of relations based on the feature information through deep learning, wherein during the deep learning, the plurality of types share a part of model parameters; and determining a relation between the plurality of entities by using the word relation tensor, so as to generate a plurality of relational triplets related to the text;

wherein identifying the plurality of entities from the text, based on the feature information comprises:

determining, from a plurality of preset label sequences, a target label sequence corresponding to the feature information;

annotating an entity type for each of a plurality of word objects in the text, according to the target label sequence;

determining a number of word objects comprised in an entity and position information of the word objects comprised in the entity in the text, according to the entity types of the plurality of word objects; and extracting the plurality of entities from the text, according to the number of word objects comprised in the entity and the position information of the word objects comprised in the entity in the text;

wherein determining the relation between the plurality of entities by using the word relation tensor, so as to generate the plurality of relational triplets related to the text comprises: for an entity pair of any two entities among the plurality of entities, acquiring entity lengths of the two entities in the entity pair;

determining a plurality of correlation values between the entity pair and the relations included in the word relation tensor, according to the entity lengths of the two entities and the word relation tensor; and in a case that at least one correlation value among the plurality of correlation values is greater than or equal to a preset threshold, taking at least one relation corresponding to the at least one correlation value as a relation between the two entities in the entity pair; and generating a relational triplet based on the two entities in the entity pair and the relation between the two entities.

2. The method according to claim 1, wherein the encoding a text to be processed to obtain a feature information comprises:

extracting a plurality of word objects from the text;

determining a plurality of word features for the plurality of word objects respectively; and encoding the plurality of word features to obtain the feature information.

3. The method according to claim 2, wherein the encoding the plurality of word features of the plurality of word objects to obtain the feature information comprises:

encoding the plurality of word features to obtain a plurality of context information of the plurality of word objects;

determining a plurality of hidden features for the plurality of word objects respectively, according to the plurality of context information; and generating the feature information according to the plurality of hidden features.

4. The method according to claim 1, wherein the determining, from a plurality of preset label sequences, a target label sequence corresponding to the feature information comprises:

determining an evaluation value matrix related to labels according to the feature information;

determining a plurality of evaluation value functions for the plurality of preset label sequences respectively, according to evaluation value matrices of a plurality of preset labels comprised in the plurality of preset label sequences;

determining a probability of each preset label sequence among the plurality of preset label sequences being selected as the target label sequence, according to the plurality of evaluation value functions; and determining the target label sequence from the plurality of preset label sequences according to the probability.

5. The method according to claim 4, wherein the determining a probability of each preset label sequence among the plurality of preset label sequences being selected as the target label sequence, according to the plurality of evaluation value functions comprises:

determining an expected value of the plurality of preset label sequences related to the text, according to the plurality of evaluation value functions; and determining the probability according to a ratio between each of the plurality of evaluation value functions and the expected value.

6. The method according to claim 1, wherein the generating a word relation tensor comprising a plurality of types of relations based on the feature information through deep learning comprises:

determining a word feature matrix according to the feature information; and generating the word relation tensor according to the word feature matrix.

7. The method according to claim 6, wherein the determining the word relation tensor according to the word feature matrix comprises:

constructing a relation core tensor, wherein the relation core tensor comprises a plurality of relational basis matrices;

generating a relation feature matrix according to a modular product between a preset relational weight matrix and the relation core tensor; and generating the word relation tensor according to the relation feature matrix and the word feature matrix.

8. A method of generating a knowledge graph, comprising:

generating the knowledge graph by using a plurality of relational triplets;

wherein the plurality of relational triplets are generated by the method of claim 1.

9. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 1.

10. A non-transitory computer-readable storage medium having computer instructions stored thereon, wherein the computer instructions are configured to cause a computer to implement the method of claim 1.

* * * * *